United States Patent
Tseng et al.

(10) Patent No.: US 8,602,769 B2
(45) Date of Patent: Dec. 10, 2013

(54) MOLD ASSEMBLY WITH LATCHING DEVICE

(71) Applicants: Chun-Wei Tseng, New Taipei (TW); Han-Wei Jiang, Shenzhen (CN); Jun-Ping Liu, Shenzhen (CN); Hao-Dong Xiao, Shenzhen (CN)

(72) Inventors: Chun-Wei Tseng, New Taipei (TW); Han-Wei Jiang, Shenzhen (CN); Jun-Ping Liu, Shenzhen (CN); Hao-Dong Xiao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/669,270

(22) Filed: Nov. 5, 2012

(65) Prior Publication Data
US 2013/0236588 A1    Sep. 12, 2013

(51) Int. Cl.
    B29C 33/20    (2006.01)
(52) U.S. Cl.
    USPC ........................................ 425/451.9; 425/595
(58) Field of Classification Search
    USPC ............................................... 425/451.9, 595
    See application file for complete search history.

(56) References Cited

U.S. PATENT DOCUMENTS

| | | | | |
|---|---|---|---|---|
| 3,004,291 A | * | 10/1961 | Schad | 425/451.9 |
| 3,199,159 A | * | 8/1965 | Wernecke | 425/595 |
| 3,323,173 A | * | 6/1967 | Poyner | 425/451.9 |
| 3,608,152 A | * | 9/1971 | Fink et al. | 425/451.9 |
| 3,659,994 A | * | 5/1972 | Ehrlich | 425/595 |
| 3,724,802 A | * | 4/1973 | Veneria | 425/589 |
| 3,825,396 A | * | 7/1974 | Kontz | 425/451.9 |
| 4,248,583 A | * | 2/1981 | Hedke et al. | 425/451.9 |
| 4,403,810 A | * | 9/1983 | Bieneck | 425/451.9 |
| 4,555,228 A | * | 11/1985 | Nishiike et al. | 425/185 |
| 4,810,182 A | * | 3/1989 | Groll | 425/595 |
| 4,828,478 A | * | 5/1989 | Hehl | 425/595 |
| 5,044,921 A | * | 9/1991 | Micelli et al. | 425/451.9 |
| 5,143,736 A | * | 9/1992 | Kumamura et al. | 425/589 |
| 5,238,387 A | * | 8/1993 | Hama et al. | 425/451.9 |
| 6,702,566 B1 | * | 3/2004 | Bellasalma et al. | 425/451.9 |

FOREIGN PATENT DOCUMENTS

DE    196 49 503    *    6/1998

* cited by examiner

Primary Examiner — James Mackey
(74) Attorney, Agent, or Firm — Altis Law Group, Inc.

(57) ABSTRACT

A mold assembly includes a first mold, a second mold, a first locking member, a second locking member and a pushing member. The first locking member is fixed in the first mold. The first locking member includes an engaging slot. The second locking member is pivotably mounted in the second mold. The second locking member includes an engaging portion. The engaging portion is engaged in the engaging slot to latch the first mold to the second mold, and the pushing member is adapted to push the second locking member to disengage the engaging portion from the engaging slot.

13 Claims, 5 Drawing Sheets

MOLD ASSEMBLY WITH LATCHING DEVICE

BACKGROUND

1. Technical Field

The disclosure generally relates to mold assemblies with latching devices.

2. Description of Related Art

A mold is a hollowed-out block that can be filled with a liquid such as plastic, glass, or metal. The liquid hardens or sets inside the mold, adopting the shape of the mold. A mold assembly usually includes a male mold and a female mold. When the mold assembly is not in use, the male mold and the female mold are usually placed apart. The male mold and the female mold may be exposed without protection and may be damaged. There is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 2:
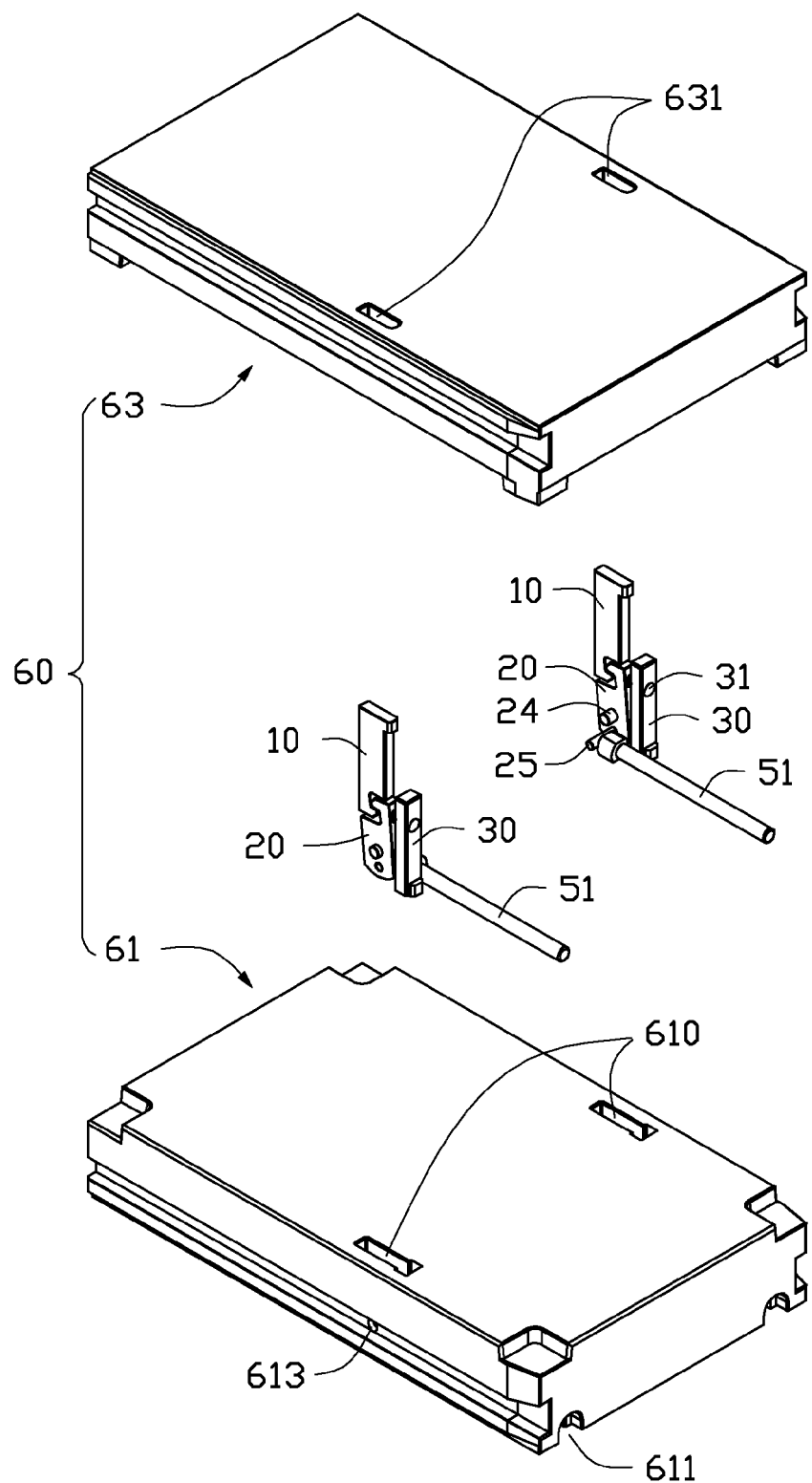
FIG. 2 is a partial exploded, isometric view of a mold assembly according to one embodiment.

Referring to FIG. 2, in one embodiment, a mold assembly 60 includes a first mold 63, a second mold 61, and two latching devices.

The first mold 63 may be a female mold and define two first locking holes 631. The second mold 61 may be a male mold and define two second locking holes 610, corresponding to the two first locking holes 631, a pivot hole 613, and a pole groove 611.

Figure 1:
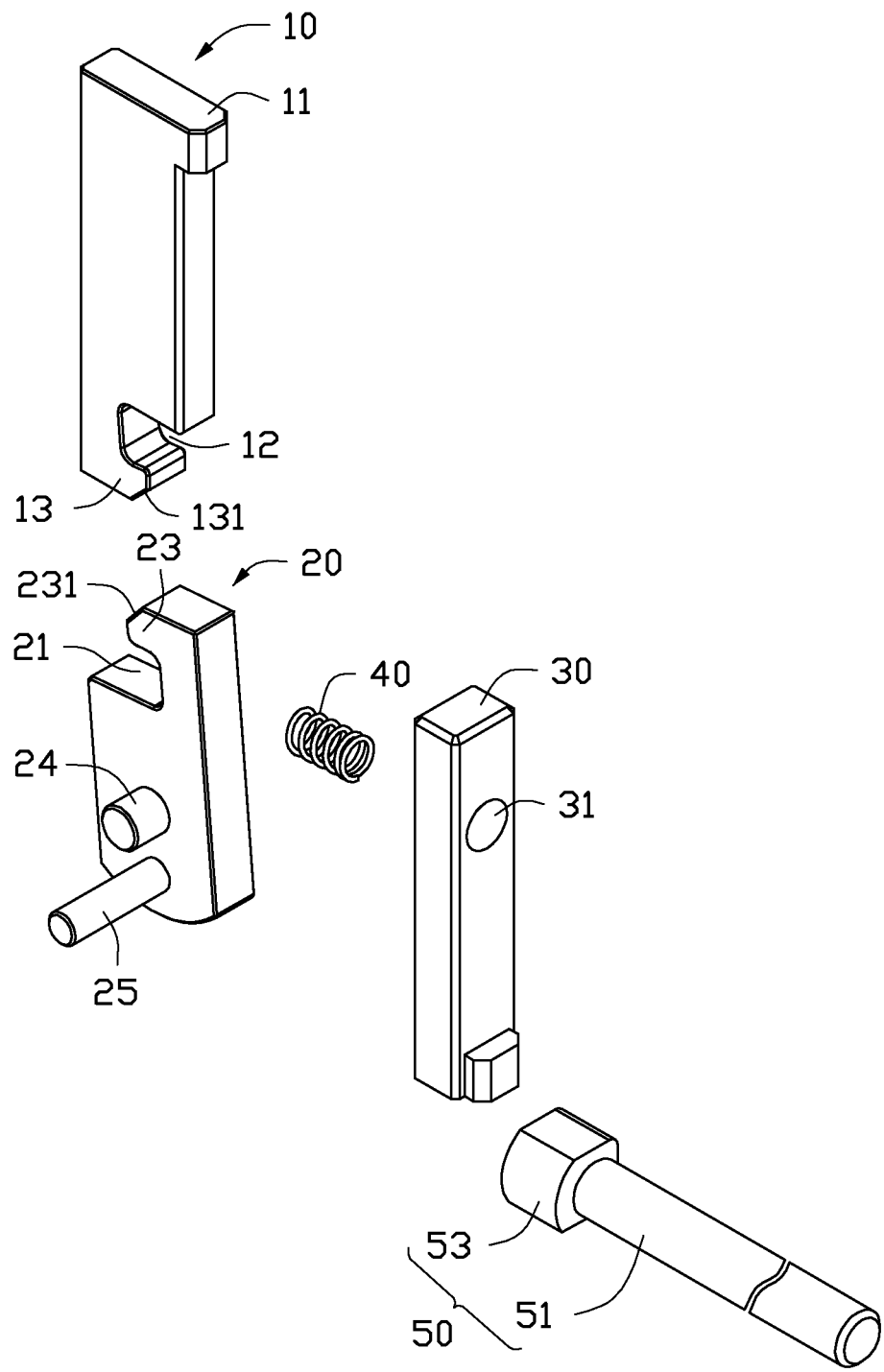
FIG. 1 is an exploded view of a latching device in one embodiment.

Referring to FIG. 1, each latching device includes a first locking member 10, a second locking member 20, a positioning member 30, a spring 40, and a pushing member 50.

The first locking member 10 includes a top surface 11 and an extension 13. An engaging slot 12 is defined in a lower portion of the first locking member 10, adjacent to the extension 13. The extension 13 includes a first slanted guiding surface 131.

The second locking member 20 includes an engaging portion 23 at a top portion. The engaging portion 23 includes a second slanted guiding surface 231. A receiving slot 21 is defined under the engaging portion 23. A pivot shaft 24 and a driving portion 25 protrude from the second locking member 20. When the first mold 63 is aligned with the second mold 61, the engaging portion 23 and the extension 13 may substantially extend toward opposite directions, and the first slanted guiding surface 131 may substantially parallel to the second slanted guiding surface 231.

The positioning member 30 has an elongate configuration. A spring hole 31 is defined in the positioning member 30 for receiving the spring 40. The spring hole 31 traverses the positioning member 30. The spring 40 may be a coil spring. The pushing member 50 includes a pole 51 and a pushing portion 53 located at a front end of the pole 51.

Figure 3:
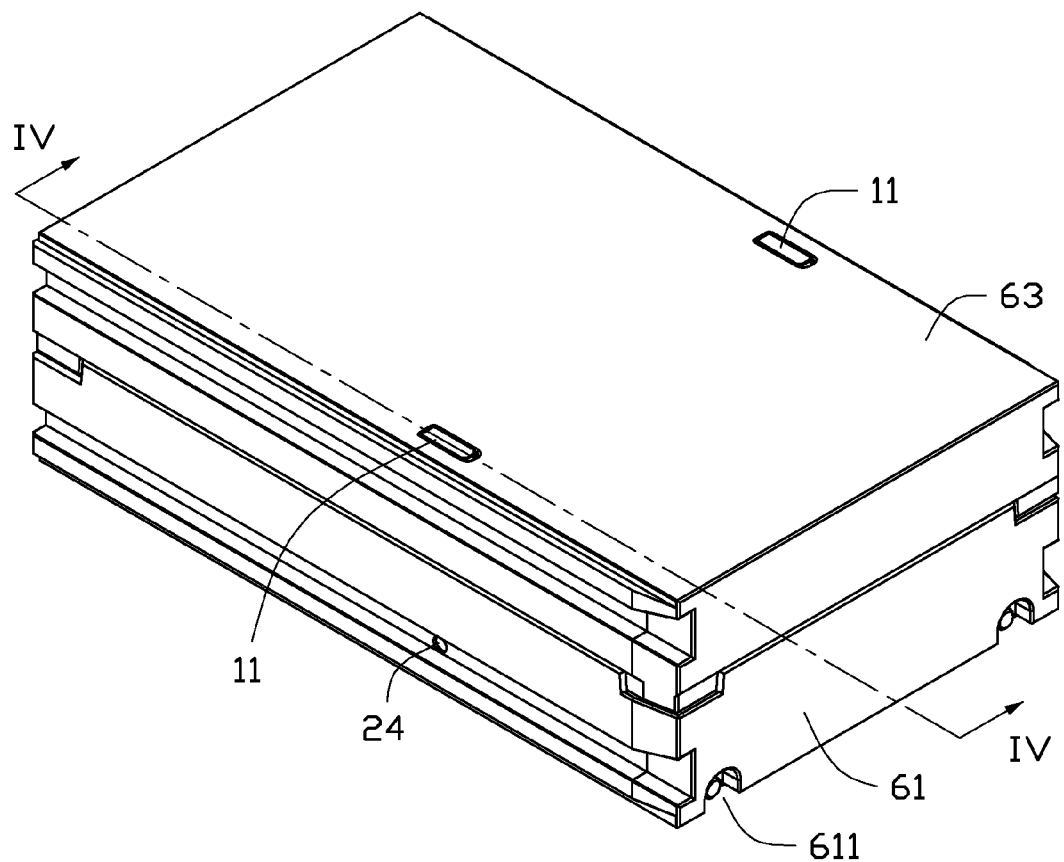
FIG. 3 is an assembled view of the mold assembly of FIG. 1.
Figure 4:
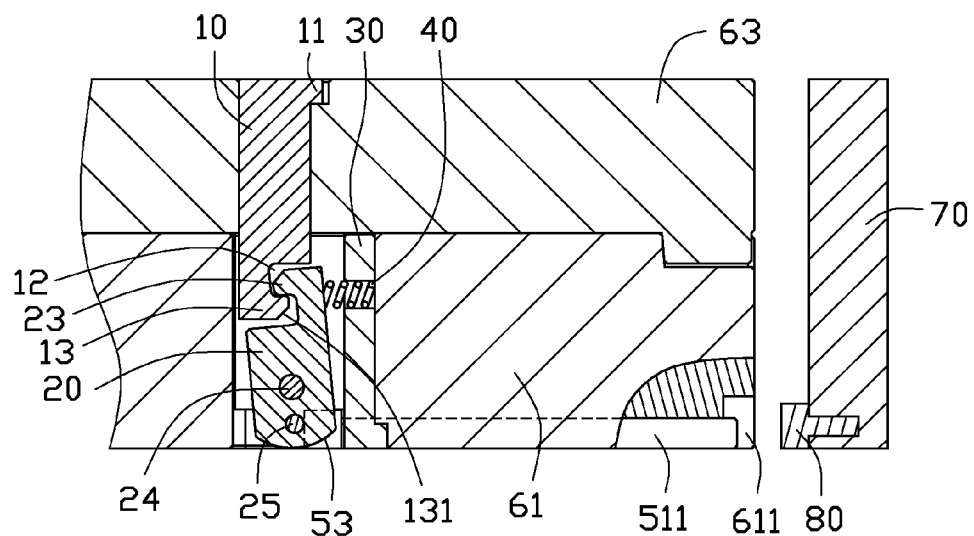
FIG. 4 is a cross-sectional view of the mold assembly along a line IV-IV of FIG. 3.

Referring to FIG. 3 and FIG. 4, in assembly, the first locking member 10 is fixed in the first locking hole 631 of the first mold 63. The top surface 11 is aligned with a top surface of the first locking member 10. The second locking member 20 and the positioning member 30 are received in the second locking hole 610. The pivot shaft 24 extends into the pivot hole 613. The second locking member 20 is pivotable to the second mold 61. The positioning member 30 is fixed to the second mold 61. The spring 40 is received in the spring hole 31 of the positioning member 30. The pushing member 50 is received in the pole groove 611 of the second mold 61.

Figure 5:
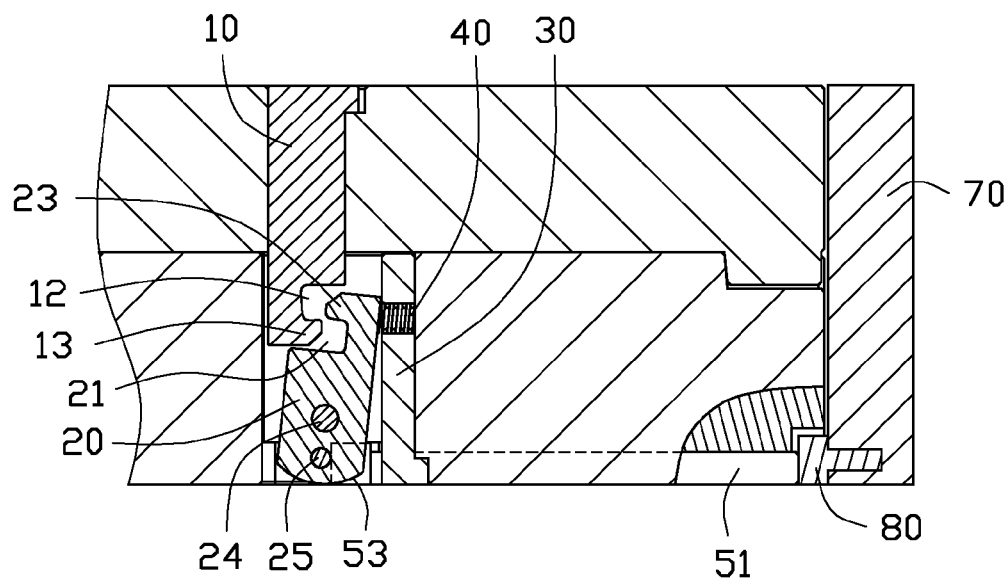
FIG. 5 is similar to FIG. 4, but a second locking member is in a disengaged position.

Referring to FIG. 5, in use, the first mold 63 moves toward the second mold 61, the first locking member 10 moves into the second locking hole 610. The first slanted guiding surface 131 of the first locking member 10 abuts the second slanted guiding surface 231 of the second locking member 20, to urge the second locking member 20 to rotate lateral side. When the extension 13 of the first locking member 10 moves over the engaging portion 23, the second locking member 20 is moved back to an original position urged by the spring 40, and the engaging portion 23 is engaged in the engaging slot 12. The first locking member 10 and the second locking member 20 are engaged.

When disengaging the first locking member 10 from the second locking member 20, the pushing member 50 is moved towards the second locking member 20. The driving portion 25 is pushed to rotate by the pushing member 50. The engaging portion 23 moves laterally to disengage from the engaging slot 12. The first locking member 10 and the second locking member 20 are therefore disengaged.

The pushing member 50 can be pushed by an operating member 70, which is located on a lateral side of the second mold 61. The operating member 70 may include a protrusion to push the pushing member 50 from lateral side.

It is also understood, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mold assembly comprising:
    a first mold;
    a second mold;
    a first locking member fixed in a first locking hole defined in the first mold, the first locking member comprising an engaging slot;
    a second locking member pivotably mounted in a second locking hole defined in the second mold, the second locking member comprising an engaging portion; and
    a pushing member extending through a pole groove defined in the second mold, and an extending direction of the pole groove being substantially perpendicular to a first extending direction of the first locking hole and a second extending direction of the second locking hole;

wherein the engaging portion is engaged in the engaging slot, to latch the first mold to the second mold, and the pushing member is adapted to push the second locking member to disengage the engaging portion from the engaging slot from a lateral side of the second mold.

2. The mold assembly of claim 1, further comprises a position member and a spring, the position member defines a spring hole, the spring is located in the spring hole, and the spring pushes the second locking member, when the second locking member is disengaged from the first locking member.

3. The mold assembly of claim 1, wherein the first locking member comprises an extension, and the extension comprises a first slanted guiding surface towards the second locking member.

4. The mold assembly of claim 3, wherein the extension and the engaging portion substantially extend toward opposite directions.

5. The mold assembly of claim 3, wherein the engaging portion comprises a second slanted guiding surface towards the first locking member.

6. The mold assembly of claim 5, wherein the first slanted guiding surface is substantially parallel to the second slanted guiding surface.

7. The mold assembly of claim 1, wherein the second locking member is adapted to rotate within a plane, the second locking member comprises a driving portion extending substantially perpendicular to the plane, and the pushing member is configured to push the driving portion to rotate the second locking member.

8. A mold assembly comprising:
a first mold;
a second mold;
a first locking member fixed in a first locking hole defined in the first mold, the first locking member comprising an engaging slot;
a second locking member movably mounted in a second locking hole defined in the second mold, the second locking member comprising an engaging portion;
a pushing member extending through a pole groove defined in the second mold, and an extending direction of the pole groove being substantially perpendicular to a first extending direction of the first locking hole and a second extending direction of the second locking hole; and
a spring;

wherein the engaging portion is engaged in the engaging slot, to latch the first mold to the second mold at an engaged position, and the engaging portion is adapted to move away from the engaging slot urged by the pushing member from a lateral side of the second mold, and is adapted to move back to the engaged position urged by the spring.

9. The mold assembly of claim 8, further comprising a position member, and the position member defines a spring hole, and the spring is located in the spring hole.

10. The mold assembly of claim 8, wherein the first locking member comprises an extension, and the extension comprises a first slanted guiding surface towards the second locking member.

11. The mold assembly of claim 10, wherein the extension and the engaging portion substantially extend toward opposite directions.

12. The mold assembly of claim 10, wherein the engaging portion comprises a second slanted guiding surface towards the first locking member.

13. The mold assembly of claim 12, wherein the first slanted guiding surface is substantially parallel to the second slanted guiding surface.

* * * * *